(12) United States Patent
Schurko et al.

(10) Patent No.: US 6,760,414 B1
(45) Date of Patent: Jul. 6, 2004

(54) PERSONAL COMPUTER BANKING SYSTEM AND METHOD

(75) Inventors: Patricia Schurko, Stow, OH (US); Paul Masarik, North Olmsted, OH (US); Donna Huddle, Kirtland, OH (US)

(73) Assignee: KeyCorp, Cleveland, OH (US)

( * ) Notice: Subject to any disclaimer, the term of this patent is extended or adjusted under 35 U.S.C. 154(b) by 1025 days.

(21) Appl. No.: 08/988,151

(22) Filed: Dec. 10, 1997

(51) Int. Cl.[7] .............................................. H04M 11/00
(52) U.S. Cl. ............................. 379/93.12; 379/265.01; 379/265.02; 379/265.03; 379/265.04; 379/265.05; 379/265.06; 379/265.07; 379/265.08; 379/265.09; 379/265.1; 379/265.11; 379/265.12; 379/265.13; 379/266.02; 379/266.08; 705/36; 705/38; 705/35; 705/42; 235/379
(58) Field of Search .......................... 235/379; 705/42, 705/35, 33, 1, 26, 38; 379/266.08, 93.12, 265.01–266.02; 380/25, 24

(56) References Cited

U.S. PATENT DOCUMENTS

| | | | | |
|---|---|---|---|---|
| 4,617,457 A | * | 10/1986 | Granzow et al. | ............ 235/379 |
| 5,025,373 A | * | 6/1991 | Keyser, Jr. et al. | ............ 705/42 |
| 5,231,571 A | * | 7/1993 | D'Agostino | ................ 705/36 |
| 5,315,504 A | * | 5/1994 | Lemble | ........................ 700/90 |
| 5,420,405 A | * | 5/1995 | Chasek | ...................... 235/379 |
| 5,561,711 A | * | 10/1996 | Muller | ....................... 379/266 |
| 5,611,052 A | | 3/1997 | Dykstra et al. | ............. 395/238 |
| 5,644,727 A | | 7/1997 | Atkins | ........................ 395/240 |
| 5,649,117 A | | 7/1997 | Landry | ....................... 395/240 |

(List continued on next page.)

FOREIGN PATENT DOCUMENTS

WO   WO 97/26614   *   7/1994   ......... G06F/157/00

OTHER PUBLICATIONS

Dialing Up The Right Numbers For Call Center Success (Bank call centers have taken on a new importance as more consumers choose to complete transactions online). Frydman, Isaac. Financial Service ONLINE, p61–64, Jan. 1996.*

Multicall as suite deal. Torode, Christina. Computer Reseller News, n755, pp 67, 73, Sep. 22, 1977.*

(List continued on next page.)

*Primary Examiner*—Tariq R. Hafiz
*Assistant Examiner*—M. Irshadullah
(74) *Attorney, Agent, or Firm*—Thompson Hine LLP

(57) ABSTRACT

A personal computer banking system and method in which a personal computer is connected by a network service provider directly to a host computer system of a bank such that customer service requests can be processed automatically without need for intervention by customer service representatives. The system is capable of distinguishing between those customer service requests which are capable of automated fulfillment and those requests which require handling by a customer service representative. The system is integrated with the host computer system of the bank so that the remote banking customer can access other automated services of the bank. The method of the invention includes the steps of inputting a customer banking request from among a menu of banking requests at a remote personnel computer; transmitting the banking requests to a host computer over a network; receiving the request at the host computer; identifying the type of customer banking request received; automatic logging of the service request, comparing the received request to a stored table of request types, each of the request types having an attribute to indicate whether the request type is capable of being fulfilled by a customer service representative or by an automated system; and, depending upon the attribute, directing the request either to a queue for handling by a customer service representative or to a queue for processing by an automated system.

39 Claims, 6 Drawing Sheets

U.S. PATENT DOCUMENTS

| | | | | |
|---|---|---|---|---|
| 5,699,527 | A | | 12/1997 | Davidson .................... 395/238 |
| 5,699,528 | A | | 12/1997 | Hogan ........................ 395/240 |
| 5,715,397 | A | | 2/1998 | Ogawa et al. .............. 395/200 |
| 5,727,249 | A | | 3/1998 | Pollin .......................... 705/40 |
| 5,754,655 | A | | 5/1998 | Hughes et al. ................ 380/24 |
| 5,757,917 | A | * | 5/1998 | Rose et al. ................... 380/25 |
| 5,822,737 | A | * | 10/1998 | Ogram ........................ 705/26 |
| 5,832,460 | A | * | 11/1998 | Bednar et al. ................ 705/27 |
| 5,903,877 | A | * | 5/1999 | Berkowitz et al. ............ 705/26 |
| 5,903,881 | A | * | 5/1999 | Schrader et al. .............. 705/42 |

OTHER PUBLICATIONS

Customizing For A U.S. Channel: Multicall has suite deal. Torode, Christina. Computer Reseller News, p67, Sep. 22, 1997.*

Banking on the net– The Most Consevative Business has some very ' out there' technology, By Alan S. Kay, Communications Week, Issue 570 p. 36. Aug. 15, 1995, Aug. 1999.*

Clever Cats or copycats. The Banker. 91 Sep. 1994.*

Potential Emplooyment Effects of the Restructuring of Retail Banking. By Lawrence J. Radecki . . . pp 75–78. FRBNY Economic Policy Review. Fenruary 1997, Feb. 1997.*

In–house banks key to netting, cost cutting, fx control. Corporate Cashflow; Atlanta ; Jan. 1995; Pinfield, Peter; Sidford, M Colleen., v16, issue 1, ISSN 10400311.*

Alan S. Kay, *banking on the net—The most conservative business has some very 'out there' technology*, Aug. 15, 1995.

Daniel Strachman, *Retail Systems: Chase Installs Unified Account—Data System*, Mar. 1, 1995.

Anonymous, *Imaging the key to re–engineering*, 10/94.

Karen Epper, *Big Banks and Processors to Pilot Test Cyber-cash System for Sales on Internet*, Nov. 2, 1995.

Financial Times London Edition, p. 20, *Technology: Any time, anywhere Many banks want to hook up to the Internet but are concerned about security* . . . , Sep. 5, 1996.

PCT/International Search Report, PCT Appl. No. PCT/US98/26300, Filed on Dec. 10, 1998.

* cited by examiner

PERSONAL COMPUTER BANKING SYSTEM AND METHOD

BACKGROUND

The present invention relates to computer banking systems and, more particularly, for computer banking systems in which a banking customer requests and obtains services over a network.

Personal computers are now commonplace in the home and in the work place. With the advent of communication service providers, such as Prodigy®, CompuServe®, the Internet and America Online®, it is now possible for users of personal computers to connect and interact with a variety of geographically remotely located service providers. In other instances, service providers supply local access numbers. One area in which such systems are employed is the area of financial services.

For example, one such banking system utilizes software designed to run in a Windows® operating environment on a personal computer. That software utilizes the computer's modem to dial up an access number maintained by the bank which provides access to the bank's host computer system. Once such a link is established, the bank customer can perform such routine banking functions as paying bills, transferring funds between accounts and reviewing account histories. In addition, such systems enable the banking customer to use the personal computer to send electronic mail ("e-mail") messages to customer service representatives to accomplish such functions as stopping payment on checks, reordering checks and the like.

A disadvantage with such systems is that the full range of banking services is not communicated to the banking customer using the personal computer, since the functions which require the sending of electronic mail are not readily displayed. Rather, the banking customer must compose an appropriate electronic mail message for those services not specifically displayed as options on the screen face of the personal computer. Furthermore, another disadvantage of such systems is that they rely upon electronic mail communication which is outside of the host computer system of the bank.

Accordingly, there is a need for a personal computer banking system in which the entire range of banking services provided to a customer are communicated to a banking customer and made available for fulfillment by the sending of requests. There is also a need to provide an integrated personal computer banking system which does not require electronic mail to convey requests to a customer service representative.

SUMMARY

The present invention is a personal computer banking system and method in which a banking customer utilizes a personal computer at a location remote from the bank host computer system, and provides the customer with the entire range of banking services displayed as options on a menu. In a preferred embodiment, the banking system utilizes a personal computer which communicates with the bank host computer system by way of a network service provider, such as CompuServe® or the Internet. Also in the preferred embodiment, the banking system of the present invention is itself capable of discriminating between those customer service requests which require the action of a customer service representative, and those customer service requests which are capable of automatic fulfillment; at no time is it necessary for the banking customer to compose and send an electronic mail message to be directed to a customer service representative.

In the preferred embodiment, the banking customer's personal computer is loaded with software capable of running in the Windows® environment, and using a modem to dial up the local access number of a network service provider. The software in the user's personal computer encrypts and sends identification information relating to the user through the network service provider to the home banking system. When received by the home banking system, it is authenticated and routed to a home banking server, which is a stand alone computer. There, the request is decrypted and routed to the mainframe computer of the bank where it is processed. The processing includes the determination of the type of service request received, and the routing of that request to the appropriate service request module in the host computer.

There are basic banking request modules for such routine functions as account information, retirement account information, credit card balances and funds transfers between accounts. In addition, certain banking requests are identified as service requests, which fall out of such routine banking functions, and are routed to a service request formatter which determines whether automated fulfillment of the request is possible. If so, the request is routed further to the appropriate automated fulfillment module; if not, the request is routed to a customer service representative, or to a back office fulfillment operation.

With respect to all of the service requests routed in this fashion, confirmation of receipt and processing of the requests is encrypted and sent back over the network to the remote personal computer.

In the preferred embodiment of the invention, such service requests as obtaining a photocopy of a check, stopping payment on a check, changing the customer's address and/or telephone number, and obtaining a copy of a statement are capable of automatic fulfillment. However, the banking customer has the option of directing other service requests to a customer service representative, who can contact the customer by telephone, mail or e-mail to answer such questions.

The method of the invention includes the steps of inputting a customer banking request from among a menu of banking requests at a personal computer, transmitting the request to a host computer remote from the personal computer over a network, receiving the request at the host computer, identifying the type of customer banking request received, comparing the type of request to a stored table of request types, each of the request types having an attribute indicating whether the request type is capable of being fulfilled by a customer service representative, back office fulfillment operation, or by an automated system, and depending upon the attribute, directing the request either to a queue for handling by a customer service representative or back office fulfillment operation, or to a queue for processing by an automated system.

The method also includes such steps as logging the request and the requested transaction so that the host computer system is updated at all times, and such logged requests can be accessed to monitor account activity, or accessed by customer service representatives. Another feature of the preferred embodiment is to provide a step of automatically transmitting current customer account information from the host computer over the network to the personal computer, so that account files at the personal computer are updated, immediately after a communication link is established.

Accordingly, it is an object of the present invention to provide a personal computer banking system in which the entire range of services offered by a bank are made available to a bank customer as options on a menu screen at a personal computer linked with the bank host computer; a personal computer banking system which utilizes a third party network service provider so that it is not necessary to maintain a large and diverse number of access numbers; a personal computer banking system and method which does not employ the use of electronic mail to convey service requests to customer service representatives; a personal computer banking system which is capable of directing customer service requests for automated fulfillment and for fulfillment by a customer service representative or back office fulfillment operation; and a personal computer banking system which is user-friendly and therefore encourages frequent use bank customers.

Other objects and advantages of the present invention will be apparent from the following description, the accompanying drawings and the appended claims.

DETAILED DESCRIPTION

Figure 1:
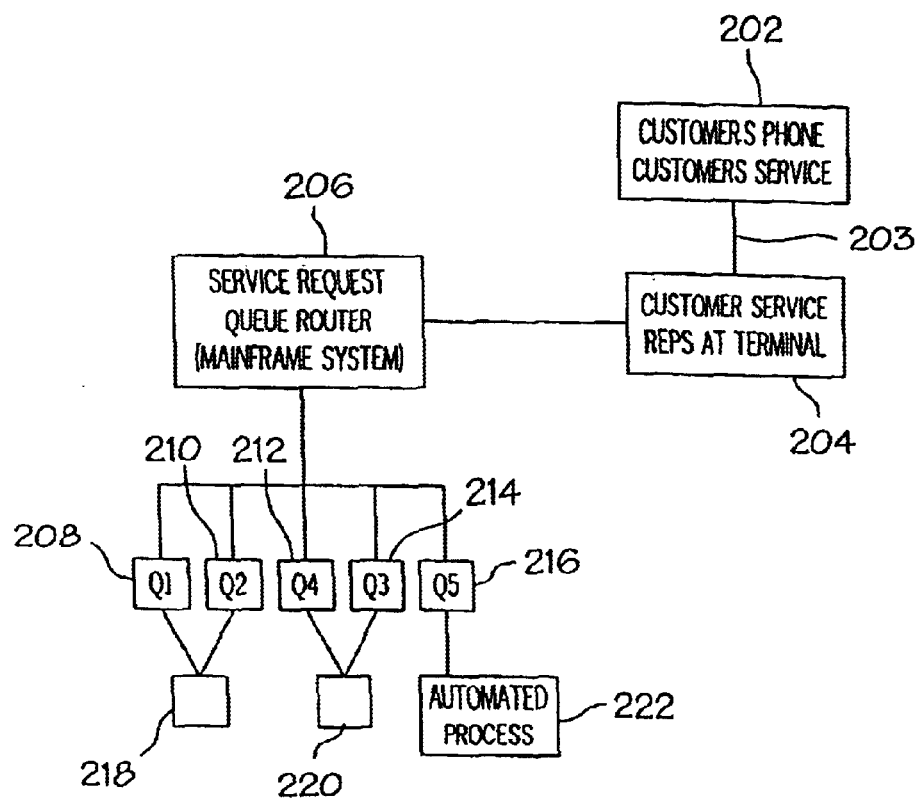
FIG. 1 is a schematic diagram of a prior art banking system.

As shown in FIG. 1, a prior art banking system, generally designated 200, is designed to provide a telephone interface between a customer and a banking customer service representative. The customer's phone, shown in box 202, is connected by a common carrier LEC or IXC (local or interexchange) to a banking customer service representative, shown in box 204. The customer verbally transmits instructions to the service representative, who then manually keys in the request to a service queue router 206, which is a part of the bank's mainframe system (not shown). The service queue router 206 includes software which is capable of interpreting the request and transmitting it to the appropriate one of the task queues 208–216. The queues 208–216 subsequently transmit the service request to the associated back office operation 218, 220, where it is processed by a bank service employee, or to an automated fulfillment processing facility 222.

Figure 2:
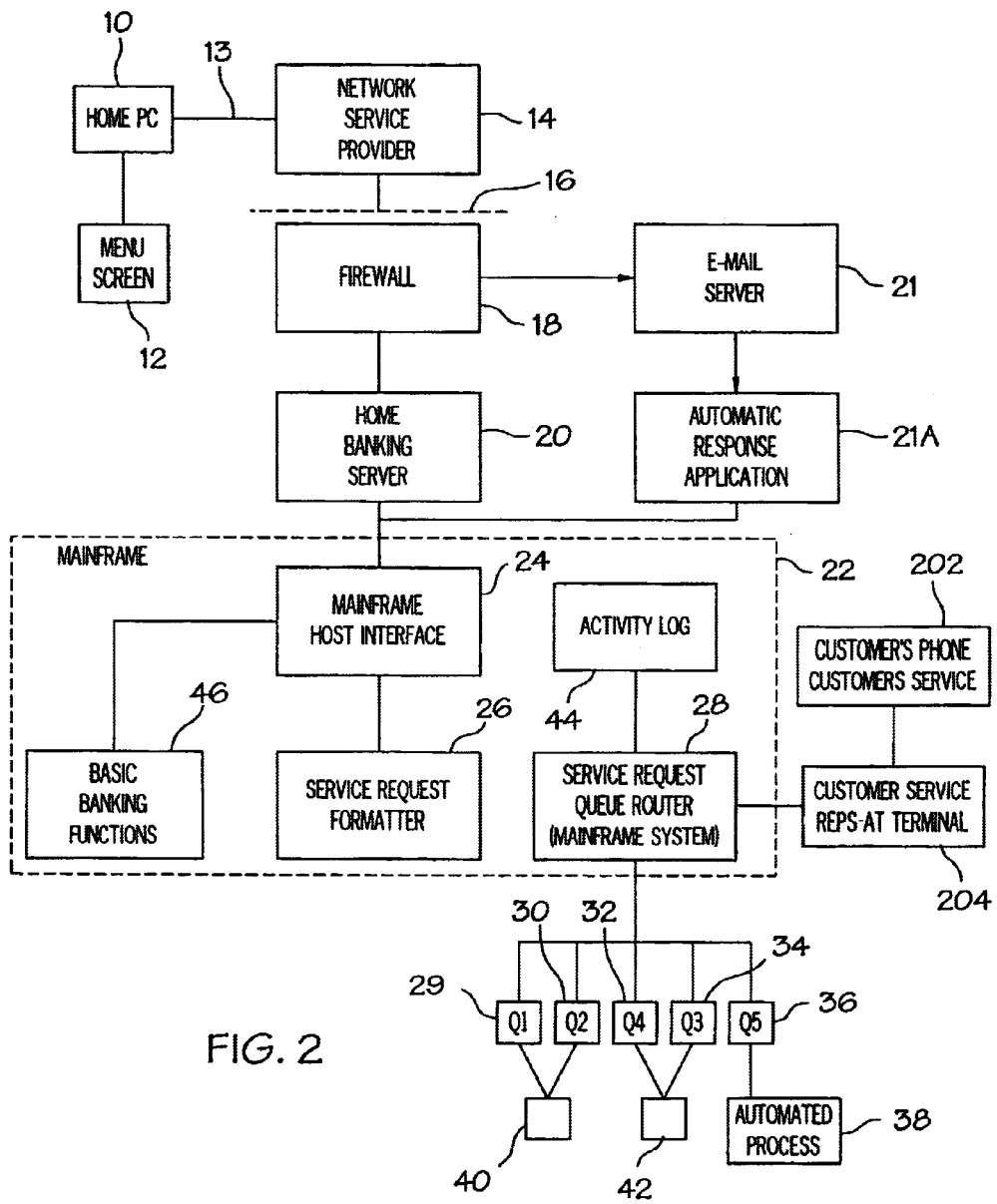
FIG. 2 is a schematic diagram of the system architecture of the personal computer banking system of the present invention.

As shown in FIG. 2, the architecture of the personal computer banking system of the present invention includes a personal computer 10 having a display screen or monitor 12. The personal computer 10 may be physically located anywhere: at the banking customer's home, at the customer's office, or the computer may be a portable laptop or notebook computer. The computer 10 includes a modem (not shown) and is loaded with conventional operating system software, such as Windows 3.1®, Windows 95®, Windows NT® or the like. The computer 10 is connected by a conventional telephone line 13 such that the modem can access a third party network service provider 14, such as Prodigy®, CompuServe®, America Online®, or a network such as the Internet, such that communications can be directed over the worldwide web from the personal computer 10. However, it is within the scope of the invention that the computer 10 be part of any data transfer system.

The network service provider 14 communicates with the home banking system of the bank, generally designated 16. Communications from the personal computer 10 are routed by the network service provider 14 to a specific network address destination, which is the security system 18 of the bank. The security system 18 preferably uses Gauntlet® software operating on a UNIX server. The security system 18 then routes an incoming message to a home banking service application, which is resident in a computer 20 that operates as a server and preferably utilizes a Windows NT® operating environment.

Alternatively, the software in the personal computer 10 of the customer generates an e-mail message, and the computer accesses an Internet service provider 14, which transmits the e-mail message to the home banking system 16. When the e-mail message is received by the firewall 18, it is routed to an e-mail server 21, which is linked to an automatic response application 21A, such as Brightware®, which in turn filters and categorizes service requests. The automatic response application 21A then forwards the service request directly to the mainframe host interface 24, bypassing the home banking server 20 which performs decryption and encryption that is not necessary for e-mail.

The server 20 includes decryption and encryption software. The server software in the home banking server 20 routes incoming messages from the personal computer 10 to the mainframe home banking system, generally designated 22. The mainframe system is a set of computer programs (written in COBOL) which operates on a mainframe computer, under the MVS operating system, utilizing CICS teleprocessing monitor and VSAM access methods. The mainframe includes a host computer interface 24 which receives requests from the home banking server 20 and routes them to the appropriate basic banking function programs 46 or to the service request formatter 26 to handle the specific requests. These service requests are properly formatted and analyzed, then sent to the service request queue router 28. The service request queue router 28 then processes the request further either by sending the request to the appropriate one of the queues 29–36 associated with automated fulfillment modules 38, to customer service representative 40 or to back office fulfillment operations 42 as part of the service operations.

Within the mainframe 22, a service request received by the service request queue router 28 is recorded in an activity log 44. Those instructions received by the mainframe which do not comprise a customer service request are routed by the host interface 24 to basic banking function modules, generally designated 46.

Figure 3:
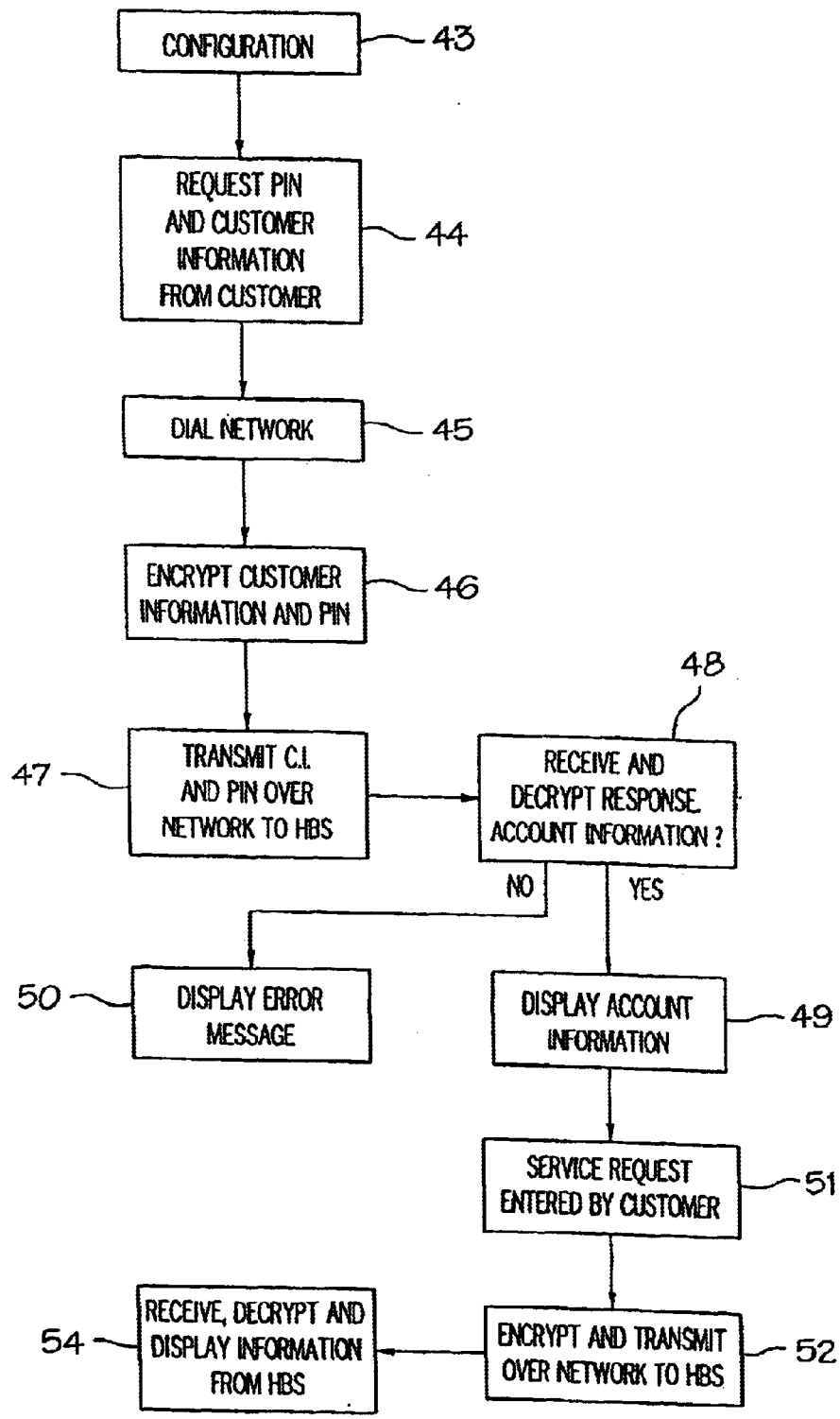
FIG. 3 is a process flow chart of the operation of the software installed in the personal computer of the system of FIG. 2, showing installation, enrollment and service request functions.

As shown in FIG. 3, the installation and enrollment of a banking customer into the personal computer banking system of the present invention is as follows. First, the banking customer obtains and installs the banking system software in the computer 10 (see FIG. 2). As shown in block 43, the software configures itself within the operating system environment of the computer 10 and thereafter requests from the banking customer a personal identification number (PIN) and appropriate other identification information from the customer, such as the customer's social security number, shown in block 44.

The software then dials the access number of the network service provider 14, shown in block 45, and thereafter encrypts the requested information, shown in block 46, and transmits the information over the network to the home banking system (shown in block 47). The transmitted information is processed by the home banking system 16 (see FIG. 2) by receiving and decrypting the response, as shown in block 48. If the enrollment has been completed successfully, the received information will enable the software in the computer 10 to notify the customer on the screen 12 and further, will provide updated account information, as shown in block 49. If the authentication is not successful, the menu screen 12 will display an error message, as shown in block 50.

Once enrollment has been completed successfully, the banking customer may now enter a service request, shown in block 51. This service request is selected from a menu of such service requests displayed on the menu screen 12. The service request is encrypted by the software in the computer 10 and transmitted over the network 14 to the home banking system 16 as shown in block 52. Confirmation information in response to the service request thereafter is received by the computer 10 through the network service provider 14 from the home banking system 16, and is decrypted and displayed, as indicated in block 54.

Figure 4:
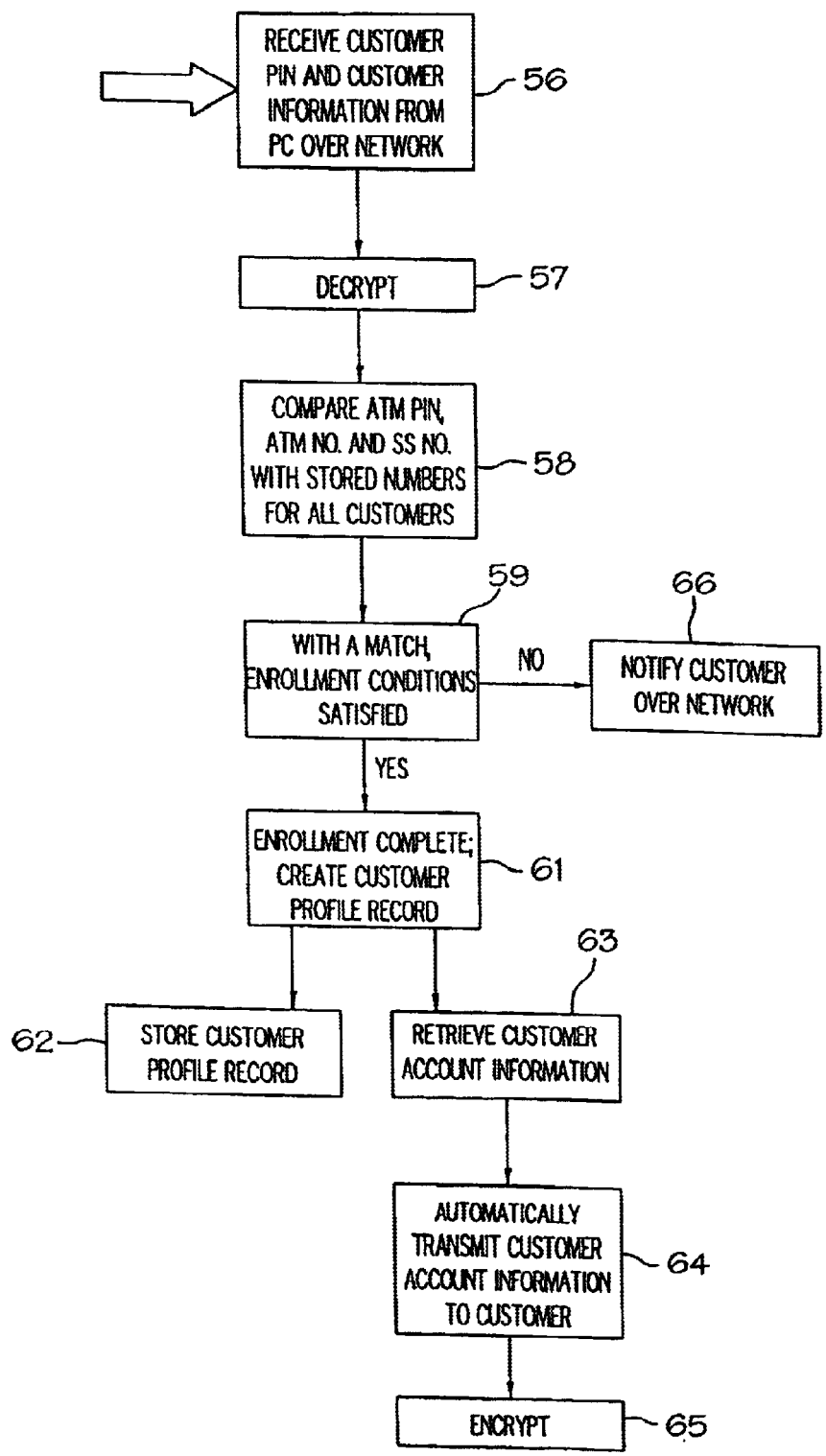
FIG. 4 is a process flow chart showing the operation of software at the bank host computer in response to an enrollment request of the system of FIG. 2.

As shown in FIG. 4, the receipt and processing of an enrollment request by the home banking system 16 (see FIG. 2) is as follows. As described with respect to FIG. 3, the personal computer 10 generates and transmits over the network service provider 14 information regarding the banking customer, such as that customer's PIN and social security number. The enrollment information is received by the security system 18, which recognizes the information as being generated by the software resident in the personal computer 10, as shown in block 56. The security system 18 then transmits the information to the home banking server 20, which decrypts it, shown in block 57. The home banking server 20 validates the request received from the computer 10 by comparing customer data such as ATM PIN, ATM number and social security number with stored customer numbers from a data base of all customer numbers, as shown in block 58, and if a match exists, as shown in block 59, the server 20 routes the information to the mainframe 22 where a customer profile record is created, shown in block 61. The customer profile record is then stored, as indicated in block 62, within the mainframe. Simultaneously, customer account information is retrieved from the appropriate legacy system of the mainframe, shown in block 63, and is transmitted to the customer, shown in block 64. This confirmation information is transmitted by the mainframe 22 to the banking server 20, where the information is encrypted (see block 65) and transmitted over the service provider 14 to the computer 10, where it is displayed on the screen 12.

If the initial conditions are not satisfied, as shown in block 66, the banking customer is notified by the home banking system 16 over the network.

Figure 5A:
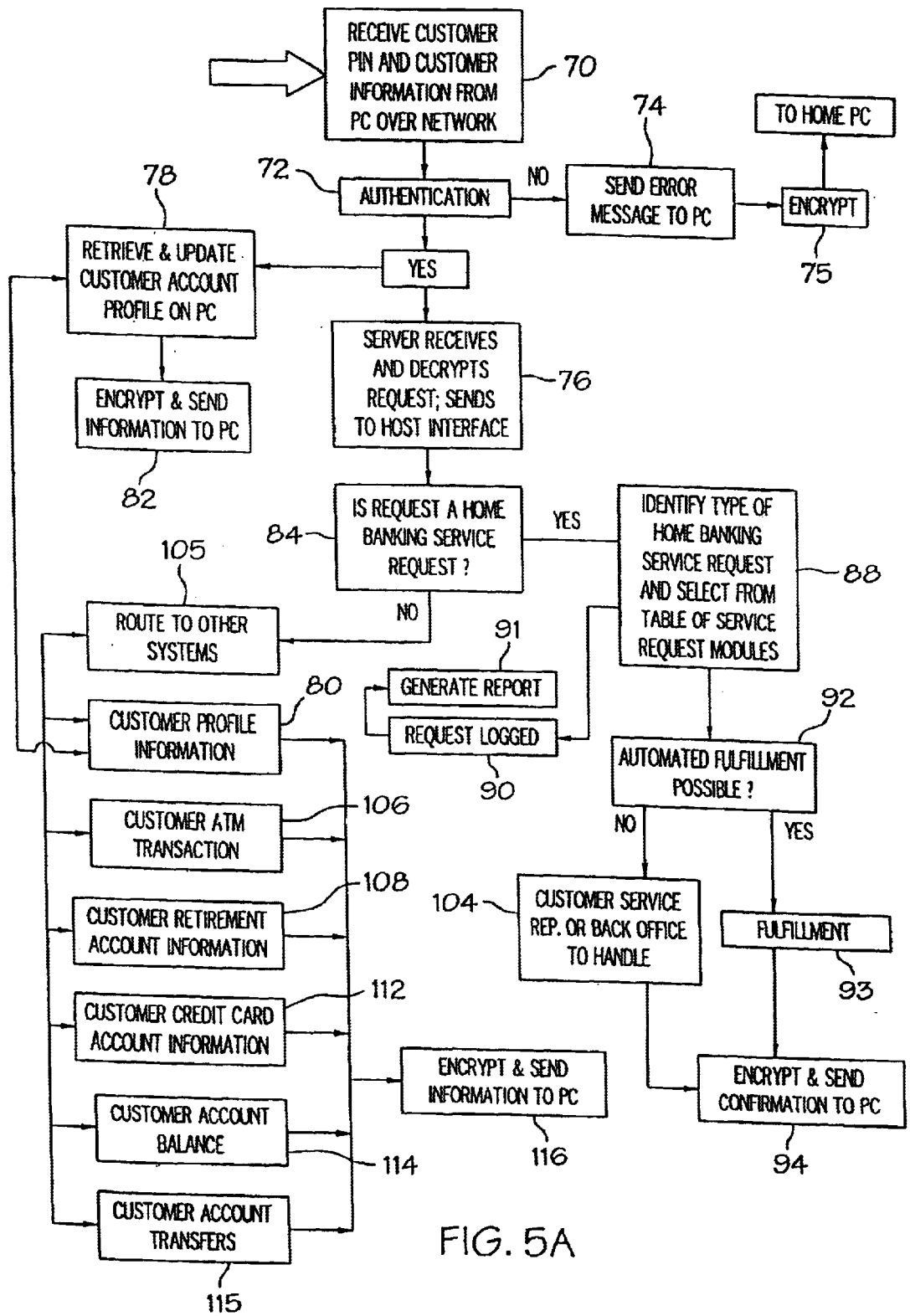
FIG. 5A is a process flow chart showing the processing of the service request received from the personal computer of the system of FIG. 2.

The procedure for the handling of a service request by the home banking system 16 (FIG. 2) received from the personal computer 10 is shown in FIG. 5A. As described previously, the banking customer selects a service request from a menu displayed on the screen 12 of the personal computer 10, and the software resident in that computer encrypts and transmits the request over the network service provider 14 to the security server 18 of the home banking system 16, as indicated by block 70. The security server 18 performs an authentication procedure, indicated at block 72, which is similar to the verification procedure of block 58 in FIG. 4. If the authentication procedure is not successful, an error message is sent to the computer 10, as indicated at block 74, after encryption, shown in block 75.

If the authentication process is successful, the service request is routed from the security server 18 to the home banking server 20, which receives and decrypts the request, indicated at block 76. At the same time, the home banking server 20 obtains through the mainframe interface 24 customer account profile information, as indicated in block 78. Such information is obtained from a customer profile information module 80, and contains data pertaining to current balances in checking accounts, savings accounts, recent account activity in such accounts, and the like. That information is encrypted and transmitted back through the network service provider 14 to be displayed on the computer 10, as indicated in block 82.

Accordingly, upon initiation of a session between the computer 10 and the home banking system 16, current account information is automatically transferred from the home banking system 16 to the personal computer 10, where it is stored and displayed. Subsequent sessions effect the same transmission of data, which update the appropriate files in the software of the personal computer 10.

Once the home banking server 20 decrypts the request, the request is sent to the mainframe host interface 24, indicated at block 76. The host interface determines whether the request is a home banking service request, shown in block 84. If the request is a service request, the type of service request is then identified and compared to a table of stored service requests by the service request formatter 26, as indicated in block 88. The request is then sent to the service request queue router 28 within the mainframe 22. At the same time, the request is logged, indicated at block 90, and a report can be generated, as shown in block 91. A determination is made by the router 28 whether the service request can be fulfilled automatically, indicated at block 92.

If the service request is capable of automatic fulfillment, shown generally as block 93, the service request queue router 28 routes the request to the appropriate service module for fulfillment. Confirmation that the request has been received and is in the process of being fulfilled is sent back through the server 20, where it is encrypted, and transmitted back over the network to the computer 10, as indicated in block 94.

Figure 5B:
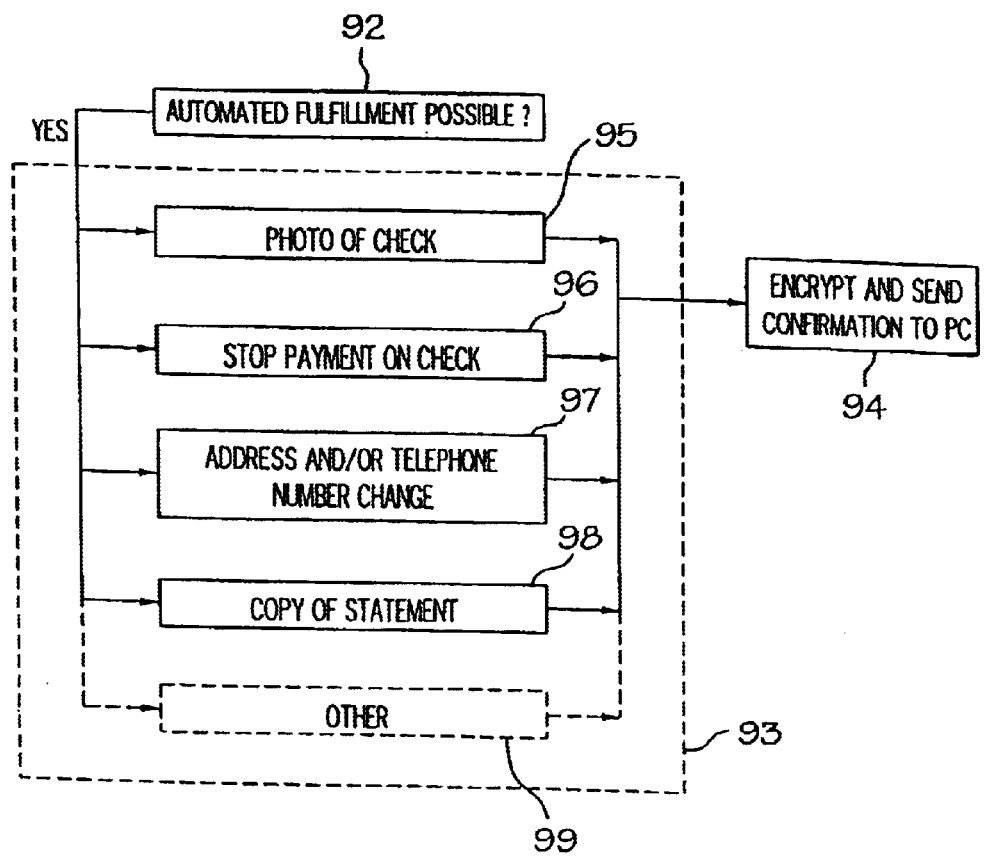
FIG. 5B is a detail of the flow chart of FIG. 5A showing the details of the automated fulfillment procedure.

As shown in FIG. 5B, the types of automated fulfillment operations may include obtaining a photocopy of a check (block 95), stopping payment of a check (block 96), changing the customer's address and/or telephone number (block 97), obtaining a copy of a statement (block 98), or other automated services (block 99).

Referring back to FIG. 5A, if automated fulfillment is not possible, or in the alternative, if the banking customer specifically requests to be contacted by a customer service representative, the service request is routed to a customer service representative or back office fulfillment operation, indicated by block 104. Confirmation that the request is being handled by a customer service representative, who will be contacting the banking customer directly, or is being handled by a back office operation, is encrypted and sent to the computer 10, as indicated in block 94. Such operations include ordering checks, requesting forms, increasing the customer's credit line, general information, including rates and fees on loans, tax information, ATM linkage, general questions and comments, and the like.

Referring to block 84, if the banking request received from the computer 10 is not a service request, the interface 24 routes the request to basic banking system modules, indicated by block 105.

The basic banking system modules comprise customer automatic teller machine ("ATM") transaction information (block 106), customer retirement information (block 108), customer credit card account information (block 112), customer account balance information (block 114) and customer account transfers (block 115). In each case, the requested information is routed from the basic banking system modules 106–115 to the mainframe interface 24, and from there to the home banking server 20 where it is encrypted and transmitted over the network service provider 14 to the computer 10, as indicated in block 116.

Accordingly, the personal computer banking system of the present invention enables a banking customer to utilize a personal computer 10 to conduct the entire range of banking services with a home banking system. The banking customer does not need to differentiate between banking requests which are service requests that are capable of fulfillment only by customer service representatives, and those which are not; the software resident in the service request formatter and the service request queue router modules are capable of distinguishing such requests and routing the requests to the appropriate service queues 29–36 (see FIG. 2). Furthermore, there is no need for a banking customer to compose and transmit electronic mail requests to the home banking system.

While the forms of apparatus herein described constitute preferred embodiments of this invention, it is to be understood that the invention is not limited to these precise forms of apparatus, and that changes may be made therein without departing from the scope of the invention.

What is claimed is:

1. A method of operating a banking system over a data transfer system comprising the steps of:
   inputting a customer banking request from among a menu of said banking requests at a personal computer;
   transmitting said customer banking request to a host computer remote from said personal computer;
   receiving said customer banking request at said host computer;
   identifying a type of customer banking request received;
   comparing said type of request to a stored table of request types, each of said request types having an attribute indicating whether said request type is capable of being fulfilled by a customer service representative or by an automated system; and
   depending upon said attribute, directing said request either to a queue for handling of said request by a customer service representative or to a queue for processing said request by an automated system.

2. The method of claim 1 wherein said directing step includes the step of formatting a transaction associated with said request.

3. The method of claim 1 further comprising the step of logging said request.

4. The method of claim 1 wherein said identifying step includes the step of identifying said customer banking request to determine whether said request is a service request.

5. The method of claim 4 wherein said identifying step includes the step of forwarding for said comparing and directing steps only those of said banking requests which comprise said service requests.

6. The method of claim 5 wherein said service requests capable of being fulfilled by an automated system comprise a request for a photocopy of a canceled check, a request for stop payment of a check, a request for address and telephone number change, and a copy of a statement.

7. The method of claim 6 wherein said processing of said automated system service requests is accomplished without use of electronic mail communication of said request.

8. The method of claim 6 wherein said customer banking requests include requesting retirement information, requesting rates and fees, requesting credit card balance information, requesting checking and savings account balance information, request for funds transfer between checking, savings and credit card accounts, request for a stop payment for a check, request for a photocopy of a check, request for general information on loans, and a request for general information on credit cards.

9. The method of claim 8 further comprising the step of sending a confirmation of receipt of said request to said personal computer.

10. The method of claim 9 wherein said sending step includes the step of encrypting said confirmation.

11. The method of claim 1 wherein said receiving step includes the step of automatically updating all account register files stored at said personal computer with transactions posted since an immediately previous session.

12. The method of claim 8 wherein said updating step includes the step of reading a customer account file in a database of customer account profiles stored at said host computer.

13. The method of claim 1 further comprising the step of updating a customer account file at said host computer subsequent to both said processing and said handling of said service request.

14. The method of claim 1 wherein said transmitting step includes the step of encrypting request; and said receiving step includes the step of decrypting said request.

15. The method of claim 14 wherein said receiving step includes the step of authenticating said request.

16. The method of claim 15 wherein said authenticating step includes the step of sending an error message to said personal computer if proper authentication data is not received.

17. The method of claim 16 wherein said proper authentication data includes a customer personal identification number.

18. The method of claim 1 wherein said transmitting step includes the step of transmitting said request over a data transfer system.

19. A method of operating a banking system over a network comprising the steps of:
   inputting a customer banking request from among a menu of said banking requests at a personal computer;
   transmitting said customer banking request to a host computer remote from said personal computer over a network;
   authenticating said request, and sending an error message to said personal computer if proper authentication data is not received;
   receiving said customer banking request at said host computer and automatically updating all account register files stored at said personal computer with transactions posted since an immediately previous session by reading a customer account file in a database of customer account profiles stored at said host computer;

identifying a type of customer banking request to determine whether said banking request is a home banking service request, and forwarding only those of said banking requests which comprise said service requests;

comparing said service request to a stored table of request types, each of said request types having an attribute indicating whether said request type is capable of being fulfilled by a customer service representative or by an automated system;

formatting a transaction associated with said request and, depending upon said attribute, directing said request either to a queue for handling of said request by a customer service representative or directing said request to a queue for processing said request by an automated system;

logging said request;

updating a customer account file at said host computer subsequent to both said processing or said handling of said service request; and encrypting and sending a confirmation of receipt of said request to said personal computer.

20. The method of claim 19 wherein said service requests capable of being fulfilled by an automated system comprise a request for a photocopy of a canceled check, a request for stop payment of a check, a request for address and telephone number change, and a copy of a statement.

21. The method of claim 20 wherein said processing of said automated system service requests is accomplished without use of electronic mail communication of said request.

22. The method of claim 19 wherein said customer banking requests include requesting retirement information, requesting rates and fees, requesting credit card balance information, requesting checking and savings account balance information, request for funds transfer between checking, savings and credit card accounts, request for a stop payment for a check, request for a photocopy of a check, request for general information on loans, and a request for general information on credit cards.

23. The method of claim 19 wherein said proper authentication data includes a customer personal identification number.

24. A computer readable memory for directing a computer network to perform a method of operating a banking system comprising the steps of:

providing a system for storing information pertaining to a customer's account;

receiving a banking request selected by a customer from among a menu of said banking requests stored at a remote personal computer;

identifying a type of customer banking request received;

comparing said type of request to a stored table of request types, each of said request types having an attribute indicating whether said request type is capable of being fulfilled by a customer service representative or by an automated system; and depending upon said attribute, directing said request either to a queue for handling of said request by a customer service representative or to a queue for processing said request by an automated system.

25. The memory of claim 24 wherein said directing step includes the step of formatting a transaction associated with said request.

26. The memory of claim 24 further comprising the step of logging said request.

27. The memory of claim 24 wherein said identifying step includes the step of identifying said customer banking request to determine whether said request is a service request.

28. The memory of claim 27 wherein said identifying step includes the step of forwarding for said comparing and directing steps only those of said banking requests which comprise said service requests.

29. The memory of claim 28 wherein said service requests capable of being fulfilled by an automated system comprise a request for a photocopy of a canceled check, a request for stop payment of a check, a request for address and telephone number change, and a copy of a statement.

30. The memory of claim 28 wherein said customer banking requests include requesting retirement information, requesting rates and fees, requesting credit card balance information, requesting checking and savings account balance information, request for funds transfer between checking, savings and credit card accounts, request for a stop payment for a check, request for a photocopy of a check, request for general information on loans, and a request for general information on credit cards.

31. The memory of claim 29 wherein said processing of said automated system service requests is accomplished without use of electronic mail communication of said request.

32. The memory of claim 24 wherein said receiving step includes the step of automatically updating all account register files stored at said personal computer with transactions posted since an immediately previous session.

33. The memory of claim 32 wherein said updating step includes the step of reading a customer account file in a database of customer account profiles stored at said host computer.

34. The memory of claim 24 further comprising the step of updating a customer account file at said host computer subsequent to both said processing and said handling of said service request.

35. The memory of claim 24 further comprising the step of sending a confirmation of receipt of said request to said personal computer.

36. The memory of claim 35 wherein said sending step includes the step of encrypting said confirmation.

37. The memory of claim 24 wherein said receiving step includes the step of authenticating said request.

38. The memory of claim 37 wherein said authenticating step includes the step of sending an error message to said personal computer if proper authentication data is not received.

39. The memory of claim 38 wherein said proper authentication data includes a customer personal identification number.

* * * * *